(12) United States Patent
Ahmad

(10) Patent No.: US 9,288,362 B2
(45) Date of Patent: Mar. 15, 2016

(54) TECHNIQUE FOR SKEW DETECTION OF PRINTED ARABIC DOCUMENTS

(71) Applicants: King Fahd University of Petroleum and Minerals, Dhahran (SA); King Abdulaziz City for Science and Technology, Riyadh (SA)

(72) Inventor: Irfan Ahmad, Dhahran (SA)

(73) Assignees: King Fahd University of Petroleum and Minerals, Dhahran (SA); King Abdulaziz City for Science and Technology, Riyadh (SA)

(*) Notice: Subject to any disclaimer, the term of this patent is extended or adjusted under 35 U.S.C. 154(b) by 21 days.

(21) Appl. No.: 14/171,370

(22) Filed: Feb. 3, 2014

(65) Prior Publication Data

US 2015/0222786 A1 Aug. 6, 2015

(51) Int. Cl.
| | | |
|---|---|---|
| *H04N 1/40* | (2006.01) |
| *H04N 1/387* | (2006.01) |
| *G06K 9/00* | (2006.01) |
| *G06K 9/32* | (2006.01) |
| *G06K 9/46* | (2006.01) |
| *H04N 1/04* | (2006.01) |

(52) U.S. Cl.
CPC .......... *H04N 1/3878* (2013.01); *G06K 9/00463* (2013.01); *G06K 9/3275* (2013.01); *G06K 9/4647* (2013.01)

(58) Field of Classification Search
CPC ............ H04N 1/3878; G06K 9/00463; G06K 9/3275; G06K 9/4647
USPC .......... 358/448, 474, 1.9; 382/176, 186, 228; 717/106
See application file for complete search history.

(56) References Cited

U.S. PATENT DOCUMENTS

| | | | |
|---|---|---|---|
| 6,038,342 A | 3/2000 | Bernzott et al. | |
| 8,218,875 B2 | 7/2012 | Al-Omari et al. | |
| 8,358,871 B2* | 1/2013 | Tu et al. | 382/289 |
| 2002/0164087 A1* | 11/2002 | Chien, II | G06K 9/32 |
| | | | 382/289 |
| 2011/0141534 A1* | 6/2011 | Safonov et al. | 358/474 |

OTHER PUBLICATIONS

Gopal Josh et al.; "Script Identification from Indian Documents"; Center for Visual Information Technology, IIIT Hyderabad, India; 2006; pp. 255-267.

* cited by examiner

*Primary Examiner* — Quang N Vo
(74) *Attorney, Agent, or Firm* — Oblon, McClelland, Maier & Neustadt, L.L.P.

(57) ABSTRACT

A digital document skew detection and correction system that uses horizontal pixel projection analysis to detect the prominent writing line of Arabic text. The system removes both small and large components and divides the document into segments. The system uses the pixel projection results at varying angles to pinpoint the highest horizontal pixel concentration corresponding to the writing line of the Arabic text to determine the skew angle for each divided document segment. The skew angle variable is averaged between the documents segments before being reattached; a user notification application is activated if the differences between skewed angles exceed a threshold. The original document is rotated in the opposite direction of the estimated skew angle to correct the skew.

13 Claims, 9 Drawing Sheets

1. Using connected component analysis remove noise and non-text elements
   a. Binarize the document if the original document is greyscale or color.
   b. Remove all small components using dynamic threshold (they normally represent noise, dots, and diacritics).
   c. Remove large components using dynamic threshold (they normally represent images, logo, printed lines, figure etc.)
2. Split the binarized document horizontally into 2 segments.
3. Estimate the coarse skew angle of the document
   a. Estimate the coarse skew angle for each segment of the document
      i. Start from angle 0 to +'x' with a step +'s'.
         1. Perform horizontal projection of the ink pixels at the current angle to locate the maximum.
         2. If maximum > previous maximum then set coarse skew angle to this angle
         3. If maximum < previous maximum then come out of the loop.
      ii. Start from angle 0 to -'x' with a step -'s'.
         1. Perform horizontal projection of the ink pixels at the current angle to locate the maximum.
         2. If maximum > previous maximum then set coarse skew angle to this angle
         3. If maximum < previous maximum then come out of the loop.
   b. If the difference between the estimated skew angles between the segments is greater than a threshold angle (th), report to the user for manual intervention.
   c. The coarse skew angle is the average of the estimated skew angles of the two segments.
4. Estimate the final skew angle for the document
   a. Estimate the fine skew angle for each segment of the document
      i. Start from coarse skew angle to +'s/2' with a step +'f' (step 'f' is for fine angle, set to 0.1 degrees).
         1. Perform horizontal projection of the ink pixels at the current angle to locate the maximum.
         2. If maximum > previous maximum then set coarse skew angle to this angle
         3. If maximum < previous maximum then come out of the loop.
      ii. Start from coarse skew angle to -'s/2' with a step +'f'.
         1. Perform horizontal projection of the ink pixels at the current angle to locate the maximum.
         2. If maximum > previous maximum then set coarse skew angle to this angle
         3. If maximum < previous maximum then come out of the loop.
   b. The final skew angle is the average of the estimated skew angles of the two segments.
5. Correct the document skew
   a. Rotate the original document image based on the estimated skew angle to correct the skew.

Fig. 4. The proposed skew detection algorithm.

| Document type | Total number of documents | Average skew per document (degrees) | Skew Detection | | | | RPT |
|---|---|---|---|---|---|---|---|
| | | | Algorithm with only one step (i.e. coarse estimate) | | Algorithm with both the steps (i.e. coarse and fine estimates) | | |
| | | | MAE | MRE | MAE | MRE | |
| Advertisement | 6 | 6.49 | 0.83 | 0.14 | 0.68 | 0.10 | 1.18 |
| Book | 12 | 4.69 | 0.43 | 0.25 | 0.11 | 0.06 | 1.24 |
| Letters | 5 | 8.00 | 0.37 | 0.06 | 0.12 | 0.02 | 1.22 |
| Magazine | 12 | 5.54 | 0.33 | 0.28 | 0.07 | 0.05 | 1.19 |
| News | 13 | 8.67 | 0.58 | 0.12 | 0.10 | 0.02 | 1.28 |
| Report | 14 | 5.07 | 0.49 | 0.13 | 0.05 | 0.01 | 1.31 |
| Total | 62 | 6.21 | 0.49 | 0.17 | 0.14 | 0.04 | 1.25 |

FIG. 5

TECHNIQUE FOR SKEW DETECTION OF PRINTED ARABIC DOCUMENTS

BACKGROUND

1. Field of the Invention

This disclosure relates to a method and corresponding computer-implemented system of detecting skew angle in skewed printed Arabic documents that are either printed or scanned and aligning to its correct horizontal position.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present invention.

Performing skew correction has become an important process that professionals and individuals have come to rely on when scanning, printing and photocopying documents. It can be difficult to obtain a scan or a photocopy of a document that is not skewed having the horizontal text aligned correctly. Skewed text can make a document look messy and unprofessional amongst other things. Therefore the value of having an automatic skew detector and corrector for professional applications can be appreciated when confronted with this issue.

An old but comprehensive survey on skew detection techniques can be found in [J. J. Hull, Document image skew detection: Survey and annotated bibliography. World Scientific, 1998—incorporated herein by reference]. Commonly used techniques for skew detection are based on Hough transformation [S. C. Hinds, J. L. Fisher, and D. P. D'Amato, "A document skew detection method using run-length encoding and the Hough transform," in Pattern Recognition, 1990. Proceedings, 10th International Conference on, 1990, vol. 1, pp. 464-468.—incorporated herein by reference], principal component analysis, projection profiles [W. Postl, "Detection of linear oblique structures and skew scan in digitized documents," in Proc. 8th Int. Conf. on Pattern Recognition, 1986, pp. 687-689; and D. S. Bloomberg and G. E. Kopec, "Method and apparatus for identification and correction of document skew," U.S. Pat. No. 5,187,753 1993—incorporated herein by reference], and connected component analysis [L. O'Gorman, "The document spectrum for page layout analysis," IEEE Transactions on Pattern Analysis and Machine Intelligence, vol. 15, no. 11, pp. 1162-1173, 1993; and Drivas and A. Amin, "Page segmentation and classification utilising a bottom-up approach," in Document Analysis and Recognition, 1995. Proceedings of the Third International Conference on, 1995, vol. 2, pp. 610-614 vol. 2.—incorporated herein by reference].

Baird's presented an algorithm for skew detection based on projection profile [K. S. Baird, "Anatomy of a versatile page reader," Proceedings of the IEEE, vol. 80, no. 7, pp. 1059-1065, July 1992.—incorporated herein by reference]. The midpoints of the bottom of each connected component in the document are projected perpendicular to projection angles. The characteristic shape of the peak was located first followed by fitting the slopes with approximating functions based on iterative non-linear separable least squares fitting algorithm. The method was stated to work on variety of documents having different layouts (multiple columns, multiple fonts and font sizes, sparse tables, and with variable line spacing). The technique works best for skew angle within ±15.0° as stated by the author and thus may not work effectively for documents having larger skews. Le et al. algorithm for skew detection is based on connected component analysis and Hough transformation [D. S. Le, G. R. Thoma, and H. Wechsler, "Automated page orientation and skew angle detection for binary document images," Pattern Recognition, vol. 27, no. 10, pp. 1325-1344, 1994.—incorporated herein by reference]. Hough transformation is applied on the pixels of the last black runs of each connected component. The maxima from the Hough accumulator array identify the skew angle. The technique was successfully applied to thousands of images of a large image database with accuracy of about 0.50 degrees. Akiyama and Hagita presented a skew detection technique based on projection profiles [T. Akiyama and N. Hagita, "Automated entry system for printed documents," Pattern recognition, vol. 23, no. 11, pp. 1141-1154, 1990.—incorporated herein by reference]. The page image is divided into columns and projection profiles are calculated for each one of them. A peak in the projection profiles implies a text line. The skew angle is calculated by finding the arctangent of the shift between the adjoining projection profiles. It is an efficient technique in terms of computation time. The algorithm can work only on regular text documents which does not contain non-text regions. Moreover it may not work effectively for large skews when the projection profiles overlaps too much. Singh et al. [C. Singh, N. Bhatia, and A. Kaur, "Hough transform based fast skew detection and accurate skew correction methods," Pattern Recognition, vol. 41, no. 12, pp. 3528-3546, 2008.—incorporated herein by reference] presented an algorithm for skew detection based on Hough transform. The technique addresses the issues related to using Hough transformation due to its space and time complexities. The speed of skew detection was improved by using a pre-processing stage where the image pixels were reduced using a modified form of Block Adjacency Graph (BAG). Next it employs the Hough transform for skew detection and finally corrects the skew using different rotation algorithms proposed. It is as an enhancement of the original algorithm presented in [H. K. Kwag, S. H. Kim, S. H. Jeong, and G. S. Lee, "Efficient skew estimation and correction algorithm for document images," Image and Vision Computing, vol. 20, no. 1, pp. 25-35, 2002.—incorporated herein by reference].

Shatnawi and Omar [M. An-Shatnawi and K. Omar, "Skew Detection and Correction Technique for Arabic Document Images Based on Centre of Gravity," Journal of Computer Science, vol. 5, no. 5, pp. 363-368, 2009—incorporated herein by reference] proposed an algorithm for skew correction of Arabic documents. In this algorithm the complete text block is inscribed in a polygon. The angle between the center of gravity (COG) of the polygon and an ideal horizontal origin is calculated as the document skew angle. The technique will work in text-only documents. Moreover it is not clear if and how the algorithm works on document images having more than one and non-uniform text blocks.

Sarfaraz and Rasheed [M. Sarfraz and Z. Rasheed, "Skew Estimation and Correction of Text Using Bounding Box," in Computer Graphics, Imaging and Visualisation, 2008. CGIV '08. Fifth International Conference on, 2008, pp. 259-264.—incorporated herein by reference] presented a technique for skew estimation and correction using bounding box technique. Bounding Box technique finds the extreme corners of text image (using projection profiles). The algorithm next calculates the Euclidean distance between these points. The slopes of adjacent sides of the bounding box are calculated to estimate the skew angle. The algorithm here too will work on text-only documents. Sarfaraz et al. [M. Sarfraz, S. A. Mahmoud, and Z. Rasheed, "On Skew Estimation and Correction of Text," in Computer Graphics, Imaging and Visualisation, 2007. CGIV '07, 2007, pp. 308-313—incorporated herein by reference] presented two different algorithms for skew detection. The first algorithm is based on finding peaks and valleys using projection profiles. The input image is bisected initially into right and left halves. Peaks and valleys for each half of the image is analyzed (using projection profile) and histograms are plotted. Lines are projected between the starting and ending points by analyzing the consecutive valleys on each segment of the image. Finally the skew angle is calculated using the trigonometric ratios. It seems the algorithm may work on very restricted types of documents having text-only regions. It is not clear if the algorithm will work on documents having multiple non-uniform text blocks. The second algorithm is based on connected component analysis and mathematical morphological operations. It is based on the observation (also a pre-condition for the algorithm) that the distance between adjacent words on different lines will be much greater than the distance between adjacent words within a line. Based on this observation, all words in a line are made as one single object or blob using mathematical morphological operations (like dilation). The skew angle is estimated by calculating the orientation of the line (the major axis of the blob is treated as the line).

SUMMARY

It is a common occurrence for a document to appear skewed when processed into a digital format. A paper document that is scanned, photocopied, printed or faxed undergoes a digitization process in a scanner or photocopier. If the paper document is not positioned correctly in the in a scanner or photocopier, or the paper feeder that auto feeds the paper document is not adjusted correctly, the paper document may not be digitized in an entirely vertical orientation, e.g., the digitized document is skewed. It is often necessary to remove the skew before the digitized document is processed further. This disclosure describes a method and apparatus for providing a straight alignment for skewed Arabic text after it has been processed into an electronic system.

The disclosure includes a system that uses a multi-step technique for detecting skewed text for printed Arabic documents. The technique focuses on the unique property of the written line of the Arabic text and on a connected component analysis with projection profiles.

The proposed technique works for various different types of Arabic documents; ones that have text with or without non-text zones. The technique is not restricted to any type or layout of document. Due to the accuracy of the proposed multi-step approach, the method enables the detection of skews with a resolution up to ±0.05 degrees.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 shows the algorithm for which the Arabic skew detection and correction follows in order to complete its tasks.

FIG. 5 is a table illustrating a summary of experimental results on skew detection using the proposed technique.

DETAILED DESCRIPTION OF THE EMBODIMENTS

Figure 1:
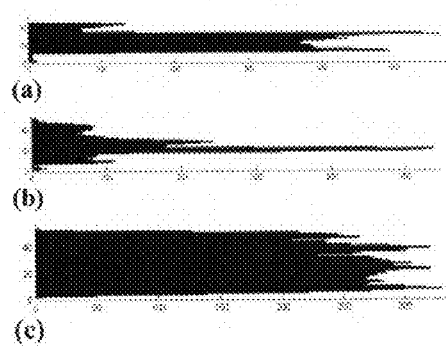
FIG. 1 shows example texts and their pixel projections for three different scripts namely Latin, Arabic, and Chinese.

Referring now to the drawings, wherein like reference numerals designate identical or corresponding parts throughout the several views, FIG. 1 shows example texts and their pixel projections for three different scripts namely Latin, Arabic, and Chinese. The reference (a) of FIG. 1 displays Latin text alongside a graphic representation of the pixel density on a vertical and horizontal scale; it reflects the lower and upper sections of the letters in the sentence. The figure illustrates the sections that have the most pixel density. While there is a slight dip in pixel density around the center of the letters, there is a significant reading above and below the center of the characters. FIG. 1 (b) illustrates that in the case of the Arabic script there is a sharp increase in pixel densities towards the center mark of the vertical axis, followed by a sharp decrease towards the lower half of the axis. This represents the 'baseline' section of the Arabic text which also represents the section where the Arabic texts joins together. The baseline is the horizontal section where text forms the most resemblance to a horizontal line. In comparison to (c) of FIG. 1 which illustrates a pixel projection of Chinese script, there is a less distinctive pattern to the pixel density. With Arabic text there is no distinct point where the text generates a more prominent pixel density. The skew detection technique disclosed herein utilizes the prominent pixel density property of the Arabic script to provide robust and reliable skew detection.

An aspect of the disclosure includes a method that exploits the sharp writing line property of Arabic script. The method is multi-stage and includes a coarse estimate of the skew as a first step and then performs a finer estimate as a next step. The method divides the digitized document into two or more segments and individually calculates the skew of each segment. The final skew is averaged from the individual skews of each divided segment.

The next step of the method is for the system to detect whether the skew of each divided segment is within a threshold. If the difference between the estimated skews for the segments is very large (above a set threshold) the method activates a prompt for manual inspection by a user. A manual inspection maybe necessary in cases where documents have varying regions with different text orientations and formats. A manual inspection procedure is prompted if the difference in skew detection by the algorithm for the two split sections of the page image is beyond a threshold. The threshold level may be set by a user based acceptable tolerance level for skew detection, the page image is flagged and the user is prompted for review. The user will have the option to either accept the detected skew angle as correct or choose to process the selected page manually. The disclosed method is not restricted only to documents with text but is instead able to work successfully on documents having large skew angles (greater than 25 degrees) as well as small skew angles (within one degree).

Figure 2:
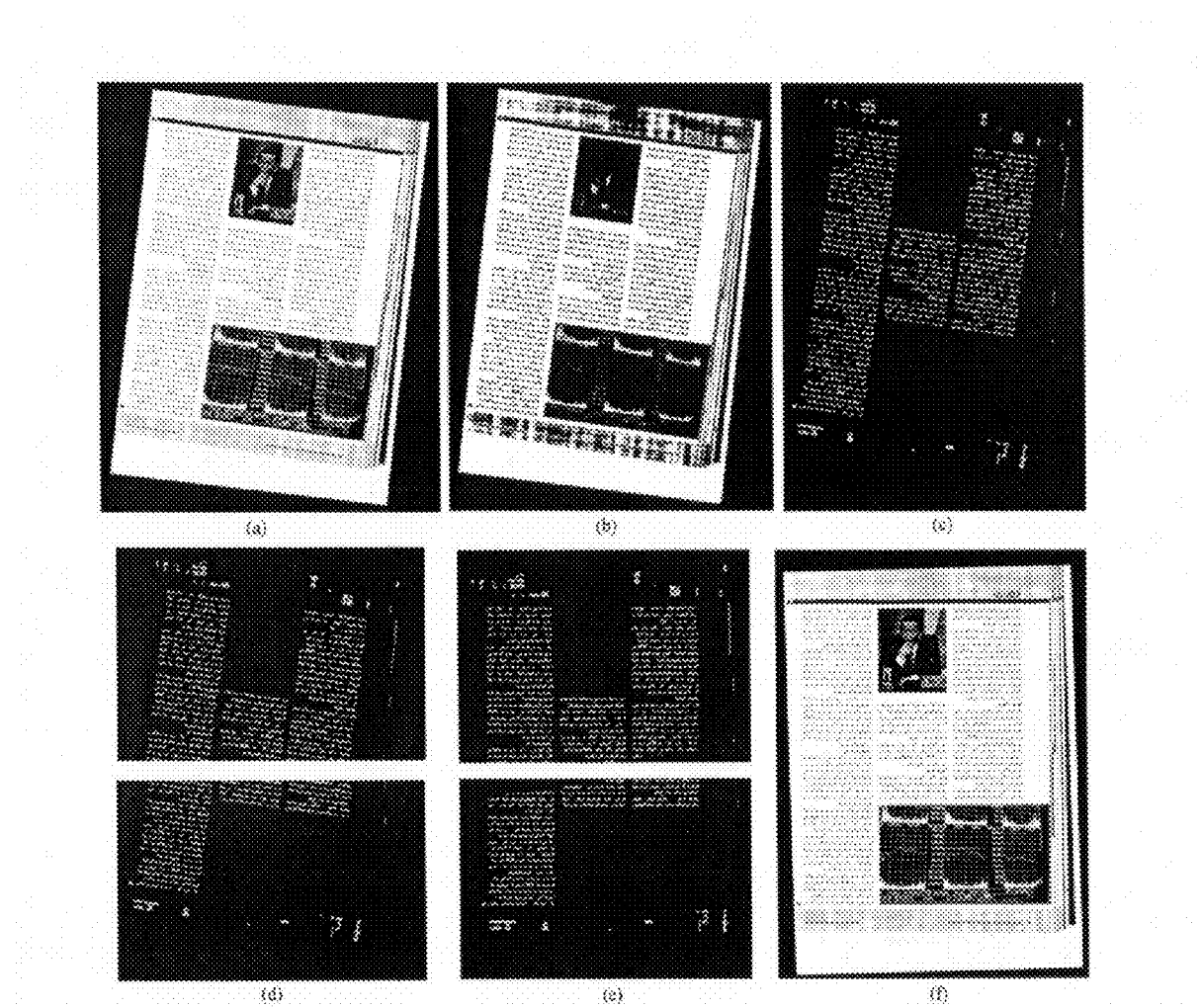
FIG. 2 is a visual illustration of the steps that are taken to perform the skew detection procedure.

FIG. 2 demonstrates the process of the document skew detection method in a step by step manner referenced a, b, c, d, e and f. The process draws on connected component analysis and pixel projections. The proposed technique exploits the sharp writing line property of the Arabic script. The document is rotated until a projection profile with a maximum concentration of pixels for the writing line is detected. At that point the document should have zero or near zero (up to ±0.05 degrees) skew angle. As projection of image pixels at different angles is time consuming and therefore the technique is capable of using a multi-level skew detection where a coarse skew is estimated by projections at relatively large angle steps. The degree of the projection can be adjusted by the user in a settings adjustment section of the program. A default setting maybe applied for the convenience of an amateur user of the system. A skew default setting of two degrees is an example of an adequate setting for the process.

The process detects whether the pixel density at step 'n+1' is lesser than step 'n'. When the pixel density at step 'n+1' is lesser than at step 'n' the technique does not advance any further in the same direction. This expedites the process further (it should be noted that however that this step to accelerate the process may not be suitable at the level of coarse estimation for documents containing sparse text). For the following step, a finer skew angle is estimated by pixel projection at small steps (typically 0.1 degrees) both clock-wise and anti-clockwise directions around the estimated skew angle during coarse estimation. If the pixel density at step 'n+1' is less than at step 'n' the technique does not advance any further in that direction.

A document image may have unrestricted layouts with different non-text regions. The projection profile by itself at times might not be robust enough to exploit the sharp writing-line property of the Arabic script. To enhance the clarity of the text very small components (which typically represent noise, dots and diacritics) and large components (which mainly represent images, printed lines, logos etc.) are removed as a first step. The technique should not be affected if some text components get removed as a result of this step. FIG. 2 demonstrates the described algorithm graphically. (a) Illustrates a digitized document that is skewed. (b) Shows the digitized document after being binarized to remove color or grayscale and undergoing a filtration process to enhance the clarity of the text by removing small components (noise, dots and diacritics). (c) Shows the scanned document after undergoing a filtration process to enhance the clarity of the text by removing large components (such as images, printed lines, logos etc.) using dynamic threshold and inverting the colors to highlight the Arabic text. (d) Illustrates a aeparation of the binarized document into two segments to estimate the coarse skew angle of the document. At this stage the skew process attempts to estimate the skew angle for each divided segment. Skew estimation may repeat a number of times in order to complete detection of the skew angle.

The algorithm for the skew detection and correction is described in FIG. 4. The first step to estimate a coarse skew angle for each segment is to determine if the document is skewed clockwise or anti clockwise by a process of an initial projection of image pixel. If it is determined that the document is skewed in a counter-clockwise direction then the process will start from angle 0 to +'x' with a step +'s' where +'x' represents the angle degree for which to rotate the document and +'s' represents the number of steps to take in a clockwise direction. At each angle +'x' a horizontal projection of the ink pixels is performed at the current angle to locate the maximum pixel density. If the maximum pixel density is greater than (>) the previous maximum pixel density then the process will set the coarse skew angle to this same direction. If the maximum pixel density is less than (<) the previous maximum then the process will exit out of the loop and will stop continuing with the coarse in the same angle direction. If it is determined that the document is skewed in a clockwise direction then the process will start from angle 0 to −'x' with a step −'s' where −'x' represents the angle degree for which to rotate the document and −'s' represents the number of steps to take in a counter-clockwise direction. At each angle −'x' a horizontal projection of the ink pixels is performed at the current angle to locate the maximum pixel density. If the maximum pixel density is greater than (>) the previous maximum pixel density then the process will set the coarse skew angle to this same direction. If the maximum pixel density is less than (<) the previous maximum then the process will exit out of the loop and will stop continuing with the coarse in the same angle direction. Whenever a difference between the estimated skew angles between the separated segments is greater than the set threshold angle (th) is detected, a notification to the user for manual intervention is prompted. The final coarse skew angle is the average estimated skew angle of the divided segments. Image (e) of FIG. 2 illustrates an estimation of the skew angle of the document. At this point the process proceeds to obtain a 'fine' angle of the skewed document. The fine angle is represented by 'f' and it is set to a degree of 0.1. From the point of obtaining a rough skew estimation, a horizontal projection of the ink pixels at the current angle is performed. It locates the maximum pixel density to obtain a fine skew angle for the document. If it is determined that the document is skewed in an anti-clockwise direction then the process would start from the coarse skew angle to +'s/2' with a fine step +'f' where +'s/2' represents the final angle degree for which to rotate the document and +'f' represents the number of 'fine' steps (set at 0.1 degrees) to take in a clockwise direction. At the angle +'f' a horizontal projection of the ink pixels is performed to locate the maximum pixel density. If the maximum pixel density is greater than (>) the previous maximum pixel density then the process will set the coarse skew angle to this same direction. If the maximum pixel density is less than (<) the previous maximum then the process will exit out of the loop and will stop continuing with the coarse in the same rotated direction. If it is determined that the document is skewed in a clockwise direction then the process will start from the coarse angle to −'s/2' with a fine step +'f' where −'s/2' represents the angle degree for which to rotate the document and 'f' represents the number of 'fine' steps to take in an anti-clockwise direction. At each angle −'x' a horizontal projection of the ink pixels is performed to locate the maximum pixel density. If the maximum pixel density is greater than (>) the previous maximum pixel density then the process will set the coarse skew angle to the same direction. If the maximum pixel density is less than (<) the previous maximum then the process will exit out of the loop and will stop continuing with the coarse in the same rotation direction.

At the end of the rotation process the skew detection application will have found its final skew angle estimation for the skewed document segments. The application then averages out the estimated skew degrees of the different document segments to obtain a final skew for the whole document. When the final skew is obtained, the application then rotates the whole of the original document based on the estimated skew angle to correct skew of the document as illustrated in FIG. 2 (f).

The skew detection and correction technique may have the ability to monitor and improve its abilities. By obtaining an error level and processing time of the skew detection and correction, the application can send automatic reports for developers to create updates and enhance the application capabilities. An element of self-detection can be in the form of obtaining the Mean of Absolute Error (MAE) of a scanned document. The skew detection and correction program can obtain valuable information to gauge its capabilities using the following equations:

$$MAE = \sum_{i=1}^{Total\ no.\ of\ documents} \frac{|skewActual_i - skewEstimated_i|}{Total\ no.\ of\ documents}$$

Where skewActual, is the actual skew of the document 'i' and skewEstimated, is the skew estimated by the technique for the document 'i.

Refining the level of error being detected can further increase accuracy when fine skewing a document, with the use of Mean of Relative Error (MRE). Mean of relative error is defined using the following equation:

$$MRE = \sum_{i=1}^{Total\ no.\ of\ documents} \frac{|skewActual_i - skewEstimated_i|/skewActual_i}{Total\ no.\ of\ documents}$$

This measure (i.e. MRE) normalizes the error based on the magnitude of the original skew.

Also obtaining the Ratio of Processing Time (RPT) is a valuable source of gauging the efficiency of the application. Ratio of processing time is defined as follows:

$$RPT = \sum_{i=1}^{Total\ no.\ of\ documents} \frac{cpuTimeRunA_i/cpuTimeRunB_i}{Total\ no.\ of\ documents}$$

Where cpuTimeRunA$_i$ is the total time taken by the two-step technique to estimate the skew of the document 'i' and cpuTimeRunB$_i$ is the total time taken by the single-step technique (i.e. only the coarse step) to estimate the skew of the document 'i'.

Figure 3:
FIG. 3 is a table with skew detection and correction results using the algorithm accompanied by images of various types of documents, both skewed and skew corrected.

FIG. 3 illustrates a sample of the documents before and after skew correction. The technique works effectively and accurately for wide variety of documents. The positive skew value in the table indicates the presence of a skew in an anti-clockwise direction. It is possible to apply a number of methods to this process, two of which are as follows: the first by a skew detection algorithm applied to only one step (coarse estimation) whereas the second method uses a second step of a finer estimation followed by the coarse estimation used to obtain an effective multi-step approach with respect to skew detection accuracy and a difference in processing time. The skew detection is more effective when both steps of the algorithm are applied. Naturally processing time increases for the two-step approach as compared to applying only the coarse estimation step of the algorithm. At an average the two-step approach takes 25% more computation time as compared to applying only a single coarse step. At the same time the two-step approach has a much lower error (reduction by 75% approximately when compared to applying only the coarse estimate).

The algorithm depicted in FIG. 4 detects the skew angle effectively even if only the coarse estimation step is applied. Therefore the application may include an adjustable setting for the operator to adjust depending on what level of accuracy vs. how much time it takes to correct the skew. Time taken to adjust the skew also depends on the system operating the application. The setting can be adjusted depending on accuracy vs. processing power of the operating system. The algorithm has proven to work with various types of documents however some documents can take longer than others to correct. Therefore an adjustable accuracy setting can be useful when deciding if time is more important than fine accuracy or vice versa especially when many documents need to be corrected.

FIG. 5 displays a table of results gathered from detecting and correcting skews from various types of documents including scanned advertisements, books, letters, magazines, newspapers and reports. The document types are listed in the far left column of the table followed by a column listing the number of documents that were scanned and then by a column stating the average skew amount in each document in degrees. The later columns in the table display results from applying the algorithm to detect the skew coarse estimate for just a single step and another set of results for both a coarse and fine step detection. For each of the skew detections (the one step approach and the two step approach) there is a calculated Mean of Absolute Error MAE and Mean of Relative Error MRE using the formulas with the values obtained from the earlier two columns. It is evident from the results that the level of accuracy of the detection using the two steps yields less error than from the detection results of the one step approach. An overall Ratio of Processing Time RPT is also calculated to detect the efficiency of the skew detection, the results aid the system to develop and measure its improvement.

Figure 6:
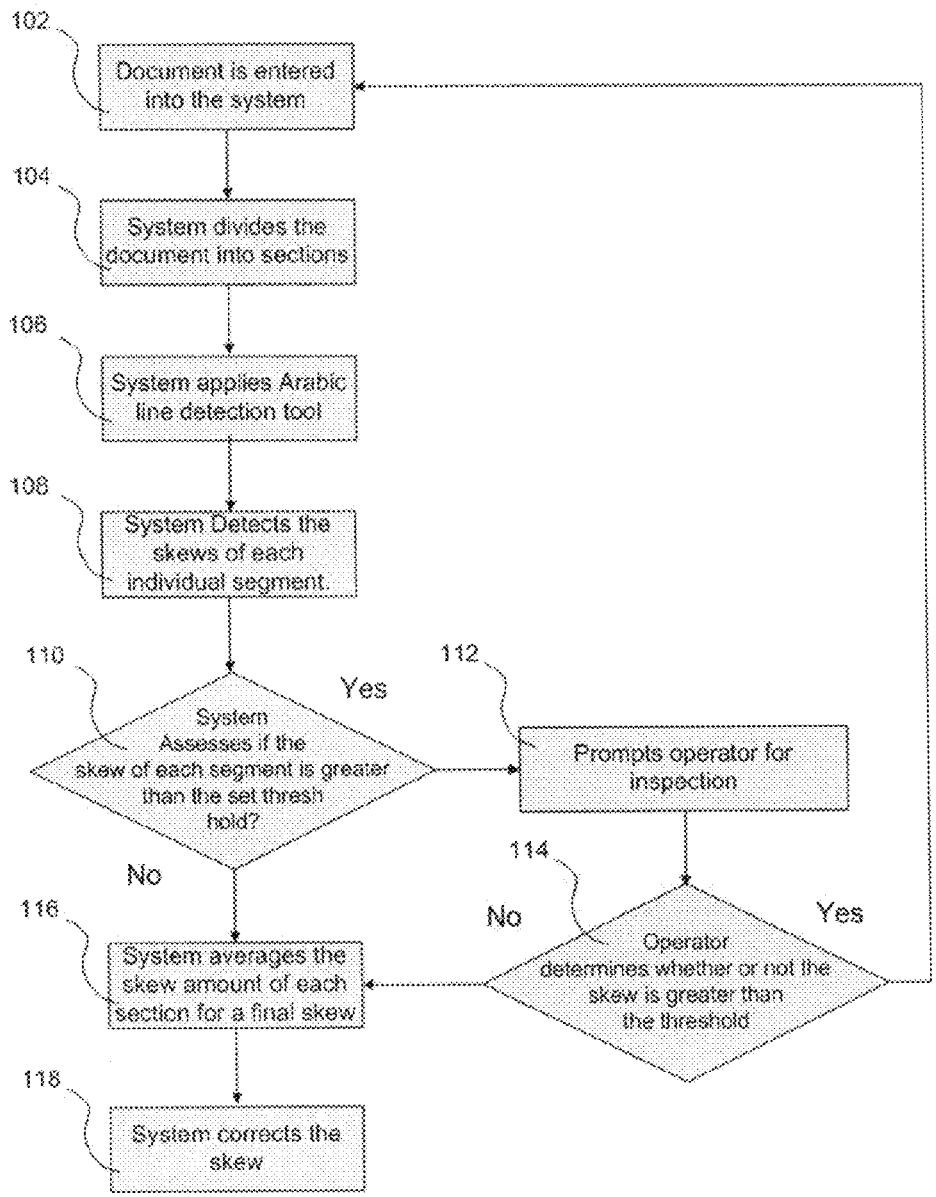
FIG. 6 is a flow chart diagram illustrating the steps in the process of preforming the skew detection and correction.

FIG. 6. Shows a flow diagram of the steps for which the skew detection and correction method takes to complete its tasks. 102 of the diagram depicts a digitized document that appears with a skewed angle being entered into the skew detecting and correcting system. In step 104 the document is binarized with small and large components using the dynamic threshold are removed before the application digitally divides each document page into 2 or more sections. In step 106 the system takes the individual divided sections and applies the Arabic line detection application in step 108 to gauge the degree of skew for each part. In step 110 the system assesses if the skew difference of divided sections are above a set thresh hold, if it is then the systems prompts the operator to inspect the results of the document skew correction 112. If the system concludes that the skew differences between the two divided sections are within the set thresh hold then the system continues its operation without notifying the operator 116. However if the operator is notified, the operator can then determine if the skew detection system has indeed made an error. If it has then the operator maybe able to determine from what the issue has come from, for example the quality of the scan for the digitized document. If the scan is the cause for the error the operator may choose to rescan the document into the system for it to attempt to skew the document again correctly or the operator may choose to cancel the skew operation. If the operator concludes that there is not a large difference between the two segments then the operation can enable the system to continue with its process and advance it to the next stage of averaging out the detected skews 116 and then proceed to the final step of correcting the alignment of the document 118.

Figure 7:
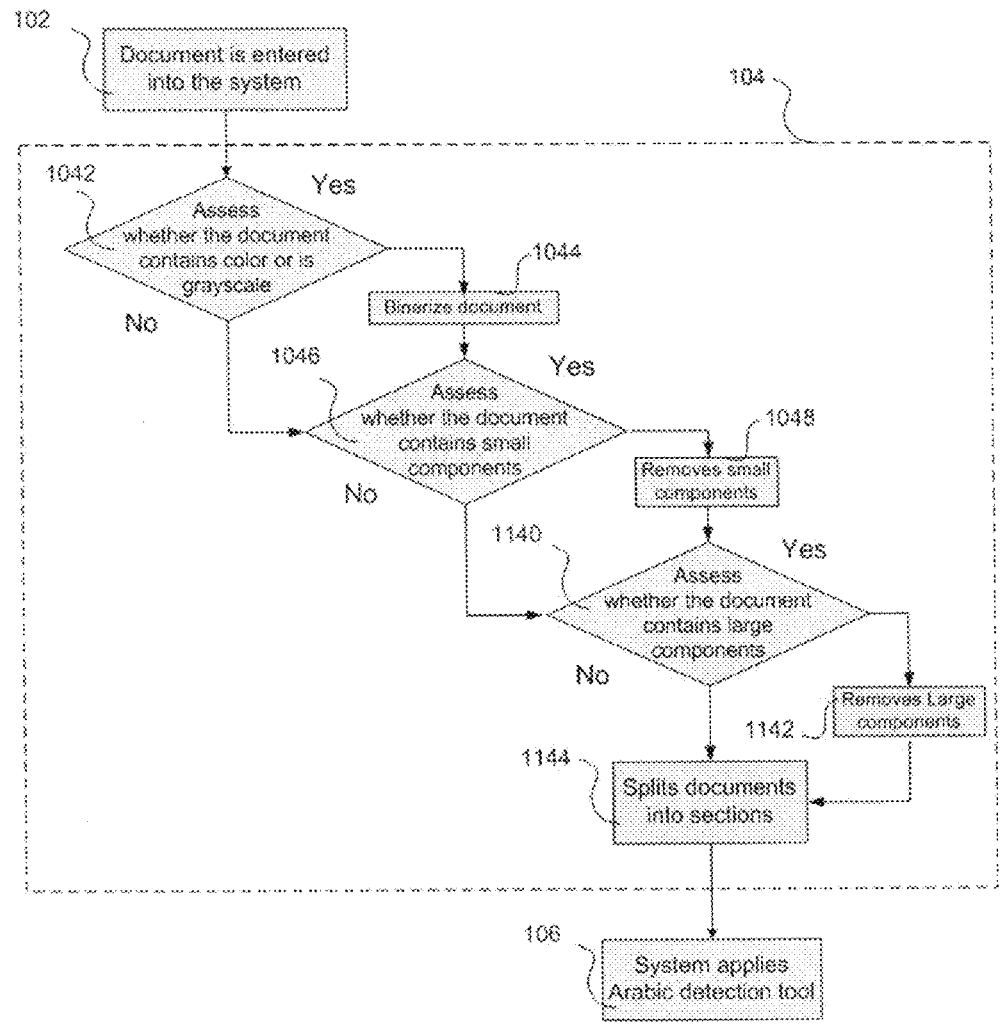
FIG. 7 is a flow chart diagram illustrating the sub-steps of binerizing and removing large and small components before splitting the documents into sections.

Some of the functional steps of the skew detection and correction process have internal systematic processes to perform some of the unique functions of the application. FIG. 7 illustrates the internal process of step 104 of the process illustrated in FIG. 5, which applies a process of dividing the document into multiple segments. After the document has been entered into the system (102) the application performs a number of internal functions before it executes the step of dividing the document into segments. Firstly the application performs an assessment to see if the document contains color or grayscale 1042. If it does contain texture it applies a binarization application 1044 to simplify and clarify the information on the document. The skew detection and correction application then performs the process of detecting small components on the document such as noise, dots, and diacritics 1046. After the detection the small components are removed using the dynamic threshold 1148. At this point the document will be binarized and will be clear of small components. The final function within the step of 104 before dividing the document is to detect and remove all large components representing images, graphs, tables, etc. 1140 and 1142. At this stage the most prominent element of the document will be the Arabic text. The document will then be divided into segments ready to perform horizontal projections of the ink pixels 1144. These steps are illustrated from (a) to (d) in FIG. 2.

Figure 8:
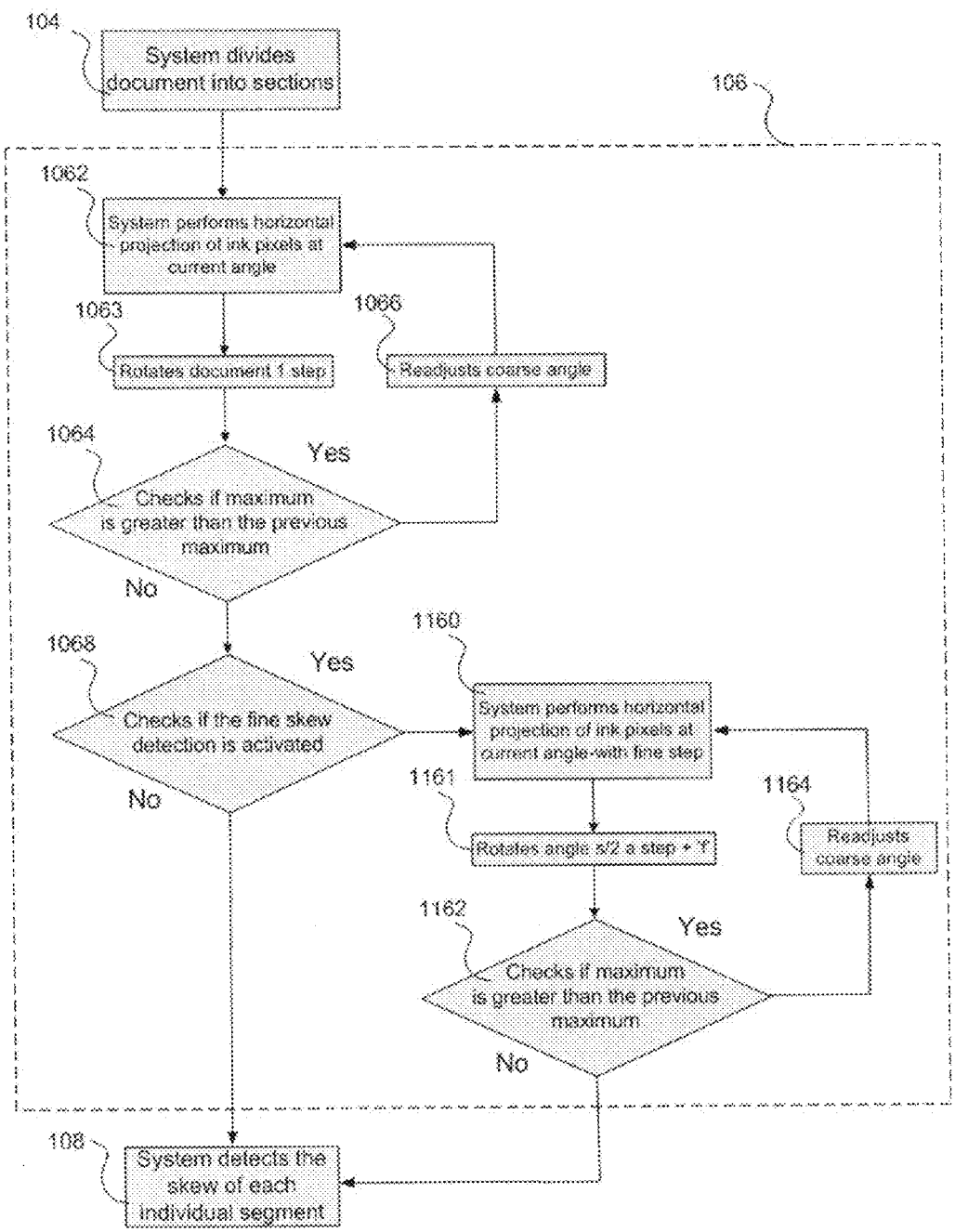
FIG. 8 is a flow chart diagram illustrating the sub-steps of incrementally rotating the document to obtain the maximum horizontal pixel projection to detect the skew angle degree.

After applying step 104 the system is ready to apply the Arabic line detection tool 106. FIG. 8 illustrates the systematic method in which the Arabic line detection tool is applied. The system performs a horizontal projection of ink pixels at the documents current angle 1062. The system then proceeds to rotate the document an incremental step at a predefined angle to either in a clockwise direction or an anti-clockwise direction 1063. The system then checks if the maximum concentration of pixels for the writing line is greater than the previous step. If it is then the system readjusts the coarse angle by assigning the new coarse angle to the document 1066 and continues to perform a horizontal projection process until the maximum pixel projection for the horizontal writing line does not exceed the previous projection. When the writing line pixel detection no longer exceeds the previous pixel detection the system moves on to a fine skew detection mode. When 1068 is activated the system will repeat a horizontal projection rotating the document by a marginal 'fine' angle degree to obtain a more accurate skew angle 1160. The system rotates the document by a fine angle of s/2 with a step of either (+) or (−) T. The system checks if the maximum pixel density is greater than the previous density 1162. If it is then document is rotated by a fine angle and the fine skew detection process 1160 is repeated until the maximum pixel density is no longer greater than the previous pixel density. At this point the system will have detected the skews of each divided segment of the document 108. The proceeding steps continue as illustrated in FIG. 5 until the document is aligned as illustrated in (e) and (f) of FIG. 2.

The disclosed method removes very large components (typically representing images, logos etc.) and very small components (noise and diacritics which are special to Arabic script) by dynamic thresholds based on connected component analysis before calculating the projection profiles. This step improves reliability of pixel projections for the task of skew estimation.

The disclosed method can be utilized for documents that are dominated by large images and other non-text components. Major non-text components are dealt with using connected component analysis and dynamic thresholding to remove them. This makes the technique very robust in case the document image has major image and non-text regions.

The disclosed method relies at least in part on the observation of unique sharp writing line property of the Arabic script by using projection profiles. In this way the method first does a connected component analysis to remove undesired components from the image before the projection profile calculations. By taking advantage of the unique features of Arabic script (in addition to the connected component analysis) the disclosed technique detects skew with resolution of ±0.05 degrees.

Figure 9:
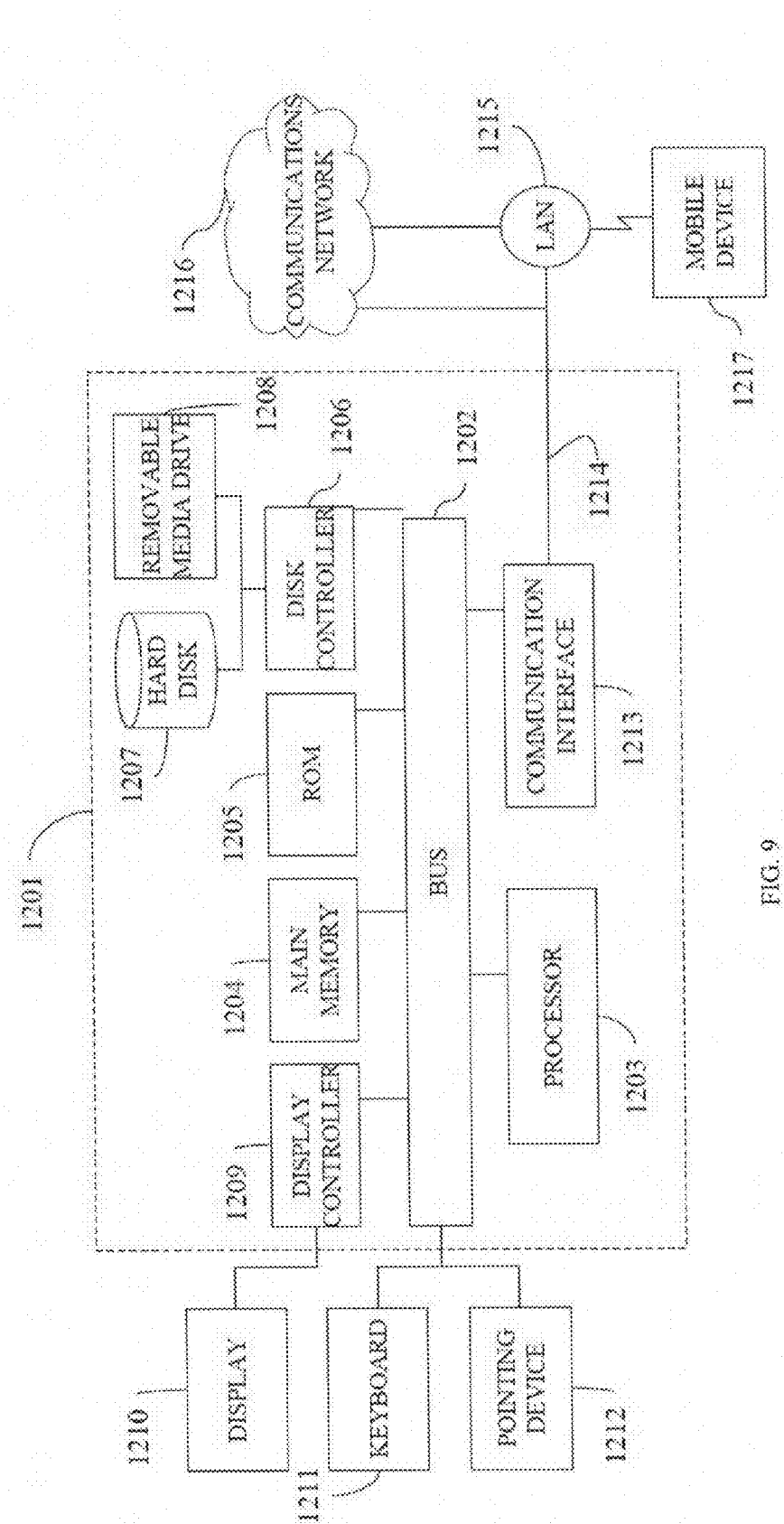
FIG. 9 is a hardware block diagram of a target tracking processor according to an exemplary embodiment.

FIG. 9 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. A document skew detection method, comprising:
binarizing, with circuitry, a document to provide a binarized document image,
performing, by the circuitry, a connected component analysis to remove noise and non-text elements from the binarized document image; then
splitting, by the circuitry, the binarized document image into a first image and a second image;
individually estimating, by the circuitry, a coarse skew angle for the first image and second image by performing a first pixel projection to determine a coarse horizontal line based on a maximum concentration of pixels in the pixel projection of a sharp writing line of script of the first image of the binarized document and the second image of the binarized document image;

individually estimating, by the circuitry, a fine skew angle within the coarse skew angle for the first image and second image by performing a second pixel projection to determine a fine horizontal line based on a maximum concentration of pixels in the pixel projection of the sharp writing line of script of the first image of the binarized document and the second image of the binarized document; and averaging, by the circuitry, the fine skew angle for the first image and the second image to determine a final skew angle.

2. The document skew detection method of claim 1, further comprising:

removing noise, diacritics and non-text related components from the binarized document according to dynamic thresholds based on the connected component analysis.

3. The document skew detection method in claim 1, further comprising:

individually rotating the first image and the second image of the binarized document image to correct the skew.

4. The document skew detection method of claim 3, further comprising:

further rotating the binarized document image at a set degree, if, during the rotating, a pixel density obtained in a rotated angle exceeds a pixel density in a previous skewed angle.

5. The document skew detection method of claim 3, further comprising:

discontinuing the rotating, if, during the rotating, a pixel density is below a previously obtained angle pixel projection.

6. The document skew detection method of claim 5, wherein:

the degree angle of the rotating is set by a default setting that is customizable by a user.

7. The document skew detection method of claim 6, further comprising:

performing a fine skew pixel projection at an increment angle degree when the concentration of pixels in the pixel projection obtained during the estimating is below a previous increment angle.

8. The document skew detection method of claim 7, further comprising:

further rotating the first image and second image of the binarized document image at a set fine degree when a concentration of pixels in the pixel projection obtained in the rotated fine angle exceeds a pixel density in a previous skewed angle.

9. The document skew detection method of claim 7, wherein:

the rotating is stopped when the concentration of pixels in the pixel projection is below a previous fine angle pixel projection.

10. The document skew detection method of claim 7, further comprising:

averaging individual skew alignment variables for the divided document images to obtain a final skew angle degree for the binarized document image.

11. The document skew detection and correction method of claim 1, further comprising:

activating a user notification application for user intervention when a skew alignment variable between the first image and the second image is greater than a set threshold.

12. The document skew detection method of claim 1, further comprising:

adjusting the estimated coarse skew angle if the maximum concentration of pixels in the pixel projection is greater than a previous maximum.

13. The document skew detection method of claim 1, further comprising:

adjusting the fine skew angle if the maximum concentration of pixels in the pixel projection is greater than a previous maximum.

* * * * *